United States Patent [19]

Lindner

[11] 4,336,176

[45] Jun. 22, 1982

[54] POLYVINYL CHLORIDE PROCESSING

[75] Inventor: Robert A. Lindner, Newberg, N.Y.

[73] Assignee: Henkel Corporation, Minneapolis, Minn.

[21] Appl. No.: 223,885

[22] Filed: Jan. 12, 1981

[51] Int. Cl.$^3$ ................................................ C08K 5/10
[52] U.S. Cl. .................................... 524/310; 524/320; 524/569
[58] Field of Search ......................... 260/31.6, 28.5 D

[56] References Cited

U.S. PATENT DOCUMENTS 3,479,308  11/1969  Gattenby ............................. 260/31.6
3,679,619  7/1972  Stapfer .......................... 260/28.5 D
4,220,570  9/1980  Loffelholz ........................... 260/31.6

*Primary Examiner*—Paul R. Michl
*Attorney, Agent, or Firm*—Forrest L. Collins; Patrick J. Span

[57] ABSTRACT

The present invention describes the manufacture of polyvinyl chloride compounds containing an organo-tin compound and a partial ester which functions both as an internal lubricant and as a co-stabilizer to scavenge hydrochloric acid thereby lessening thermal degradation of the product.

11 Claims, No Drawings

POLYVINYL CHLORIDE PROCESSING

BACKGROUND OF THE INVENTION

1. Description of the Field of the Invention

This invention describes additives for processing polyvinyl chloride compounds. The present invention is particularly concerned with calendering operations concerning such polyvinyl chloride compounds.

2. Description of the Art Practices

This invention, as previously noted, relates to the processing of polyvinyl chloride compounds. In particular, this invention is concerned with polyvinyl chloride compounds which are formed utilizing as a primary stabilizer organo-tin materials. It has been found necessary to utilize stabilizers in polyvinyl chloride products to scavenge hydrochloric acid which is formed by the thermal degradation of the polymer. The scavenged acid is converted by the organo-tin compound to the corresponding tin salt. The need to scavenge the hydrochloric acid arises because it further degrades the polyvinyl chloride product and in the absence of a scavenger, the rate of degradation is greatly accelerated by the presence of the hydrochloric acid. It has been found that the esters used herein provide low viscosity in processing of the melted polyvinyl chloride with no observable lower threshold on the amount of ester employed. That is, ordinarily internal lubricants do not function at less than 0.5 percent by weight of the polyvinyl chloride but that the present invention employs an ester which does reduce viscosity at lower concentrations.

Certain work concerning the partial esters of pentaerythritol for use in polyvinyl chloride resins is described in U.S. Pat. No. 4,220,570 issued Sept. 2, 1980 to Worschech et al.

Throughout the specification and claims, percentages and ratios are by weight and tempertures are in degrees Celsius unless otherwise noted. The terms pentaerythritol, tetrakis (hydroxymethyl) methane, and 2,2-bishydroxymethyl-1,3-propanediol are used interchangeably herein.

SUMMARY OF THE INVENTION

A process is described for manufacturing a polyvinyl chloride containing composition having therein a primary stabilizer which is an organo-tin compound to stabilize against the thermal degradation of the composition, the improvement therein comprising adding to such composition an effective amount of an internal lubricant to lower the melt viscosity during preparation of such composition said lubricant being partial fatty ester of 2,2-bishydroxymethyl-1,3-propanediol wherein said partial ester is about 20 percent to about 50 percent monoester, about 35 percent to about 65 percent diester, and about 10 percent to about 35 percent by weight triester said composition being substantially free of unreacted 2,2-bishydroxymethyl-1,3-propanediol and the tetraester wherein the ester is formed from a fatty acid having the following composition:

(a) 0 percent to 15 percent by weight 14 carbon saturated fatty acid;
(b) 0 percent to 10 percent by weight 15 carbon saturated fatty acid;
(c) 25 percent to 75 percent by weight 16 carbon saturated fatty acid;
(d) 0 percent to 10 percent by weight 17 carbon saturated fatty acid;
(e) 25 percent to 75 percent by weight 18 carbon saturated fatty acid; thereby lowering the melt viscosity during preparation of such composition.

Compositions are also described.

DETAILED DESCRIPTION OF THE INVENTION

The present invention, as previously noted, relates to the process of manufacturing a polyvinyl chloride compound containing therein a primary organo-tin stabilizer and a partial ester as more particularly described later which functions as an internal lubricant during a calendering operation and which also functions as a co-stabilizer.

The unique compound which functions as an internal lubricant and as a co-stabilizer in the organo-tin stabilizer polyvinyl chloride system is a partial ester of pentaerythritol as described below. The basic description of the partial ester is made in the Summary of the Invention and the reader is referred thereto.

The fatty acid distributions which have been found particularly useful are from about 0 percent to about 10 percent by weight of the 14 carbon fatty acid; from about 0 percent to about 8 percent of the 15 carbon fatty acid; from about 30 percent to about 70 percent of the 16 carbon fatty acid; from about 0 percent to about 8 percent of the 17 carbon acid and from about 30 percent to about 70 percent by weight of the 18 carbon acid. More preferably, the distribution of the acid chain lengths utilized in the partial ester are from about 1 percent to about 5 percent by weight of the 14 carbon fatty acid; from about 0.1 percent to about 5 percent of the 15 carbon fatty acid; from about 35 percent to about 55 percent of the 16 carbon fatty acid; from about 1 percent to about 5 percent of the 17 carbon fatty acid and from about 40 percent to about 55 percent by weight of the 18 carbon acid. The chain length of the fatty acid is essential to ensure that the proper internal lubricating effect is obtained. Higher or lower fatty acids give unpredictable lubricating effects and are thus not as useful as the blends described herein.

The partial ester of the pentaerythritol is so formed such that the partial ester will be substantially free of the unreacted pentaerythritol and substantial free of the tetraester. Neither of these compounds is particularly useful compared to the resultant mixture of partial esters which give both an internal lubricating and co-stabilizing effect. The partial ester is preferably so formed to provide from about 25 percent to about 45 percent by weight of the monoester; from about 40 percent to about 60 percent of the diester and from about 15 percent to about 30 percent by weight of the triester. More preferably, the ratio of the mono-, di- and tri-partial esters of pentaerythritol is from about 27 percent to about 35 percent by weight of the monoester; from about 45 percent to about 55 percent by weight of the diester; and from about 18 percent to about 23 percent by weight of the triester. It is particularly preferred that the foregoing composition as previously noted be substantially free of the tetraester. This compound, however, has been found to be capable of being present at levels of up to 5 percent by weight, preferably not greater than 3.5 percent by weight of the polyvinyl chloride compound without causing substantial difficulties in the processing.

It is also highly desired that the polyvinyl chloride compound be substantially free of fatty acids as these compounds may form soaps thereby leading to unwanted lubricating effect and lack of clarity in clear articles.

The tin compounds of the present invention are conveniently dioctyl tin and dibutyl tin and mixtures thereof. Other suitable organo-tin compounds which may be used in the present invention include: dimethyl tin and dilauryl tin all of which are usually used as the thioglycolate. The organo-tin is conveniently used at levels of 0.3 to 5 percent, preferably 0.5 to 2.5 percent by weight of the polyvinyl chloride compound.

The tin compounds are used to stabilize the cler polyvinyl chloride products used for example in blister packaging. The partial esters of the present invention are obtained by reacting the desired mixture of fatty acids with the pentaerythritol. It is highly preferred that the hydroxyl number of said compounds be in the range of 190 to 210 and most preferably from 195 to 205. The reaction to form the pentaerythritol esters as previously noted involves obtaining the desired fatty acid chain length mixture and thereafter reacting it with pentaerythritol. This reaction proceeds at a temperature of from about 140 degrees C. to about 220 degrees C. and is complete in about 3 to 8 hours. The pentaerythritol is added to a mixing pot containing the fatty acids while exercising control on the rate of reaction. By controlling the rate of reaction, it is assured that substantially all of the pentaerythritol present is converted to the monoester. Thereafter, the monoester is converted to the diester and higher esters.

The utilization of the compounds of the present invention as previously noted in particularly for calendering operations. Calendering is an operation where the polyvinly chloride resin is compressed between rollers and formed into sheets which are then formed into the desired article containing the polyvinyl chloride resin. As calendering operations are well known in the art, no particular description is given of the utilization of the compounds of the present invention in the calendering operation. It is sufficient to say that the compositions utilized in the process of the present invention are useful throughout the calendering industry. The calendering operation is initiated by mixing the polyvinyl chloride resin with the organo-tin stabilizer and the partial ester in the required amounts and thereafter thoroughly mixing such composition together and heating prior to delivery to the calendering roll.

The following are examples of the present invention.

EXAMPLE I

A partial ester of pentaerythritol which is very useful as an internal lubricant and as a co-stabilizer in organo-tin stabilized polyvinyl chloride clear plastics is formed as follows.

A saturated fatty acid having the following acid chain length distribution is obtained.

Percent by Weight:
 3 —C14 Fatty Acid
 0.5 —C15 Fatty Acid
 42.5 —C16 Fatty Acid
 2 —C17 Fatty Acid
 52 —C18 Fatty Acid The fatty acid so obtained is reacted under vacuum (with prior nitrogen sparge) at 77.66 parts by weight thereof with 29.22 parts by weight of pentaerythritol. Tin oxide is used as a catalyst at 0.05 parts. The resulting ester, following a reaction time of about 4 hours at 190 degrees C., is a compound whch contains 30 percent monoester, 50 percent diester and 20 percent triester.

The partial ester has a melt point of 50–55 degrees C. The reaction is conducted such that the compound is substantially free of free fatty acids with an acceptable acid number of less than 2.5, in this case 0.9. The saponification number should be in the range of 160 to 180 and is in this example 177.5 with a hydroxyl number of 200. The composition is substantially free of any unreacted pentaerythritol. The tetraester is not found in significant amounts in the composition.

This Example may be varied by employing a substantially pure fatty acid mixture containing 55 parts 18 carbon acid and 45 parts 16 carbon acid.

EXAMPLE II

A fully formulated polyvinyl chloride composition is prepared as follows: 0.2 parts by weight of the partial pentaerythritol ester of Example I is blended together with 1.5 parts of dioctyltin diglycolate and 100 parts of polyvinyl chloride resin. The mixture is heated to a temperature of 200 degrees C. and subjected to a calendering operation. The calendering operation uses a 450×220 mm roll at 200 degrees C. at a pressure of 4.4 kilopunkts and a roll speed of 12.5 rpm's.

The composition prepared as above when tested shows a substantial viscosity reduction at less than 0.5 part of the partial ester in the polyvinyl chloride composition. A composition showing a comparison where the amount of stearyl stearate utilized as the lubricant in place of the partial ester requires 1.0 parts before an internal lubricating effect is obtained. One example shows a known internal lubricant to show an increase in flow resistance and not to meet the viscosity reduction even at levels of use seven times greater than that of the presently claimed internal lubricant. It is also noted that the compositions made with the partial esters are substantial more stable due to the ability of the unreacted hydroxyls on the ester to form an organic chloride and to liberate water. This is particularly beneficial in that tin salts are utilized for their low toxicity, however, tin salts when utilized as Hcl scavengers are not particularly effective and thus, the additional benefit of the partial ester is observed.

Substantially similar results are observed when substituting the various acid chain length mixtures and degrees of partial ester formation throughout the ranges previously described.

What is claimed is:

1. A process for manufacturing a polyvinyl choride containing composition having therein a primary stabilizer which is an organo-tin compound to stabilize against the thermal degradation of the composition, the improvement therein comprising adding to such composition an effective amount of an internal lubricant to lower the melt viscosity during preparation of such composition said lubricant being a partial fatty ester of 2,2-bishydroxymethyl-1,3-propanediol wherein said partial ester is about 20 percent to about 50 percent monoester, about 35 percent to about 65 percent diester, and about 10 percent to about 35 percent by weight triester said composition being substantially free of unreacted 2,2-bishydroxymethyl-1,3-propanediol and the tetraester wherein the ester is formed from a fatty acid having the following composition:

(a) 0 percent to 15 percent by weight 14 carbon saturated fatty acid;
(b) 0 percent to 10 percent by weight 15 carbon saturated fatty acid;
(c) 25 percent to 75 percent by weight 16 carbon saturated fatty acid;
(d) 0 percent to 10 percent by weight 17 carbon saturated fatty acid;
(e) 25 percent to 75 percent by weight 18 carbon saturated fatty acid; thereby lowering the melt viscosity during preparation of such composition.

2. The process of claim 1 wherein the organo-tin compound is selected from the group consisting dioctyl-tin and dibutyl-tin diglycolate and mixtures thereof.

3. The process of claim 1 wherein the partial ester is present at from about 0.1 percent to about 1.5 percent by weight of the polyvinyl compound.

4. The process of claim 1 wherein the polyvinyl chloride compound is substantially free of fatty acids.

5. The process of claim 1 wherein the acid portion of the partial ester has the following carbon chain length distribution:
(a) 0 percent to 10 percent by weight 14 carbon saturated fatty acid;
(b) 0 percent to 8 percent by weight 15 carbon saturated fatty acid;
(c) 30 percent to 70 percent by weight 16 carbon saturated fatty acid;
(d) 0 percent to 8 percent by weight 17 carbon saturated fatty acid;
(e) 30 percent to 70 percent by weight 18 carbon saturated fatty acid.

6. The process of claim 1 wherein the tin compound is dioctyl-tin diglycolate.

7. The process of claim 1 wherein the organo-tin compound is dibutyl-tin diglycolate.

8. The process of claim 1 wherein the organo-tin compound is present at to about from about 0.5 percent to about 2.5 percent by weight of the polyvinyl/chloride compound.

9. The process of claim 1 wherein the acid portion of the partial ester has the following carbon chain length distribution:
(a) 1 percent to 5 percent by weight 14 carbon saturated fatty acid;
(b) 0.1 percent to 5 percent by weight 15 carbon saturated fatty acid;
(c) 35 percent to 55 percent by weight 16 carbon saturated fatty acid;
(d) 1 percent to 5 percent by weight 17 carbon saturted fatty acid;
(e) 40 percent to 55 percent by weight 18 carbon saturated fatty acid.

10. The process of claim 1 wherein the partial ester is about 25 percent to 45 percent monoester, from about 40 percent to 60 percent diester, and from about 15 percent to 30 percent triester.

11. The process of claim 1 wherein the melt viscosity reduction effect of the partial ester is present at levels of less than 0.5 percent by weight of the polyvinyl chloride compound.

* * * * *